(12) United States Patent
Yamazaki

(10) Patent No.: US 6,496,286 B1
(45) Date of Patent: Dec. 17, 2002

(54) IMAGE READER

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/322,156

(22) Filed: May 28, 1999

(30) Foreign Application Priority Data

May 28, 1998 (JP) .......................................... 10-147881

(51) Int. Cl.[7] ................................................ H04N 1/46
(52) U.S. Cl. ...................................... 358/514; 358/518
(58) Field of Search ................................ 358/514, 512, 358/513, 505, 506, 509, 483, 518, 487, 474; 250/208.1, 234–236

(56) References Cited

U.S. PATENT DOCUMENTS 5,500,746 A * 3/1996 Aida ........................... 358/518
5,917,620 A * 6/1999 Hasegawa et al. .......... 358/513
6,144,469 A * 11/2000 Suganuma ................... 358/514
6,316,761 B1 * 11/2001 Yamaguchi ................ 250/208.1

* cited by examiner

Primary Examiner—Cheukfan Lee
(74) Attorney, Agent, or Firm—Sughrue Mion, PLLC

(57) ABSTRACT

The image reader comprises n(integer of 2 or more) pieces of line sensors arranged in parallel disposed at an equal pitch and shifted at a 1/n pitch in a sensor arranging direction (main scanning direction) with respect to other line sensors, first compensating unit for compensating spatial positions of the line sensors, second compensating unit for compensating a train of signals of each of the line sensors so that a predetermined moving average of a target pixel of the signal train in one line sensor among the line sensors is, in a signal train of another line sensor among them, coincident with a predetermined moving average of a target pixel corresponding to the target pixel in the one line sensor, and interleaving unit for interleaving the signals which have been compensated by the second compensating unit. The image reader is capable of increasing a resolution while simply keeping an area of light receiving elements of a sensor to some extent at a low cost.

6 Claims, 6 Drawing Sheets

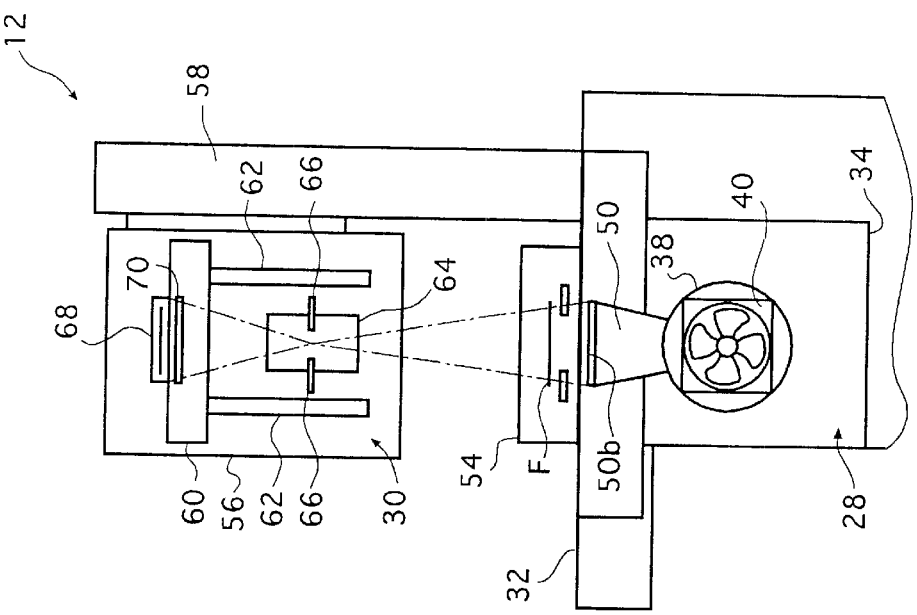
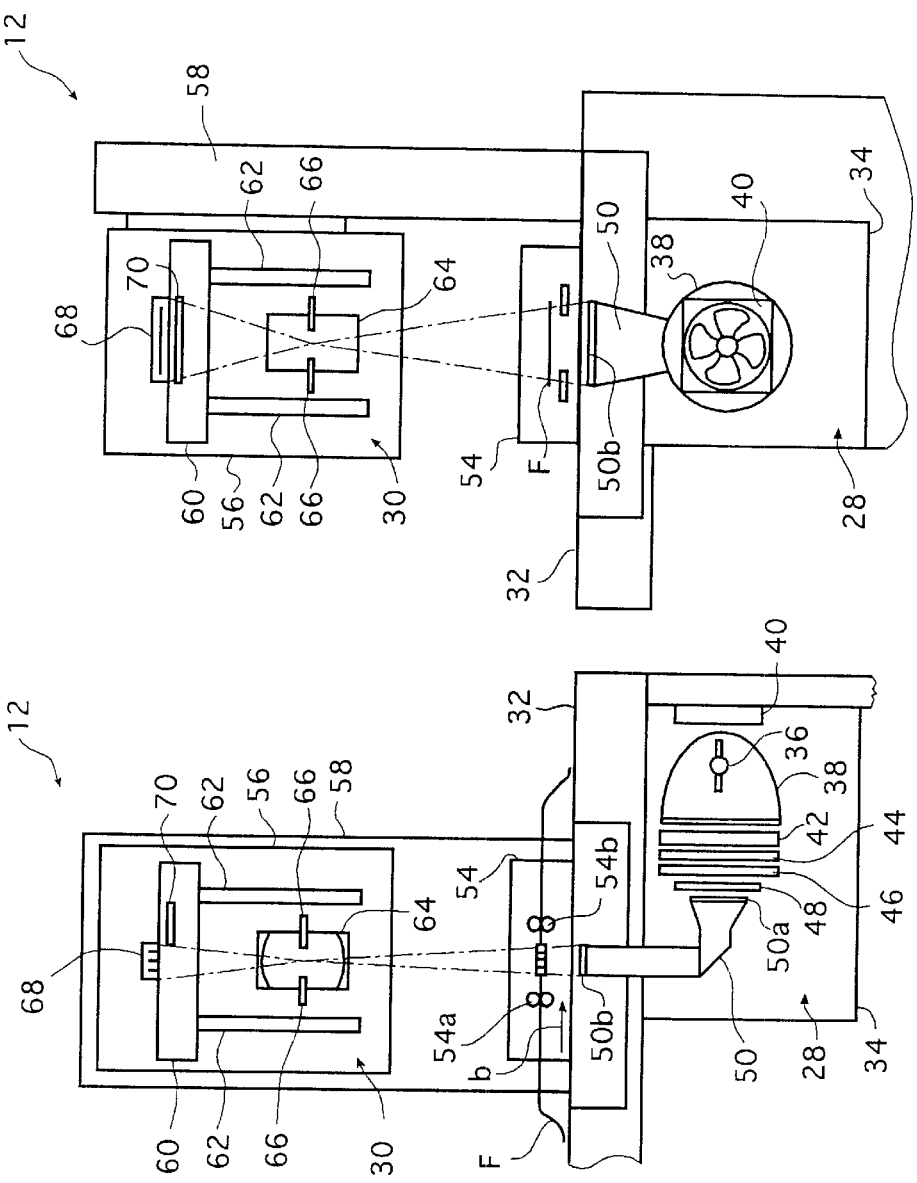

IMAGE READER

BACKGROUND OF THE INVENTION

The present invention relates to a technical field of an image reader, for photoelectrically reading an image photographed on a film, etc., utilized in a digital photo printer or the like for obtaining a print (a photograph) on which this image is reproduced.

What has hitherto been a dominant exposure used for printing on a photosensitive material (photographic printing paper) an image photographed on a photographic film such as a negative film and a reversal film, etc. (which are simply referred to as a film), is a so-called direct exposure (an analog exposure) in which the image on the film is projected upon the photosensitive material, and the surface of the photosensitive material is exposed to the light.

By contrast, there has been utilized in recent years a printing apparatus using a digital exposure, i.e., a digital photo printer for photoelectrically reading an image recorded on a film, converting the read image into digital signals, thereafter converting the digital signals into image data for recording by executing a variety of image processes thereon, recording the (latent) image by scan-exposing a photosensitive material to recording light beams modulated corresponding to the image data, and obtaining a (finished) print.

The digital photo printer is capable of determining an exposure condition when in printing through image data processing with the image as a digital image data and therefore capable of obtaining a high grade print, which could not acquired by the conventional direct exposure, by preferably compensating a washed-out highlight and a dull shadow of the image which are caused due to the back-light and the flash photography, etc., executing a sharpness (sharpening) process and compensating a color or density failure. The digital photo printer is also capable of synthesizing a plurality of images and dividing the image and further synthesizing characters and so on by the image data processing, and capable of outputting the prints freely edited and processed according to applications.

Besides, the digital photo printer is capable of supplying a computer, etc. with the image data and storing a recording medium such as a floppy disk, etc. with the image data as well as outputting the images as a print (a photograph), and hence the image data can be utilized for a variety of applications excluding the photographs.

This type of digital photo printer is basically constructed of an image input device having a scanner (an image reader) and an image processor, and an image output device having a printer (an image reader) and a processor (a developing unit).

The scanner, with reading light beams emitted from a light source being incident upon a film, obtains projection light beams bearing an image photographed on the film, forms the image of the projection light beams on an image sensor such as CCD sensor, etc. through an image forming lens, then effects a photoelectric conversion thereof, thus reads the image, executes various image processes thereon according to the necessity, and thereafter transmits image data (image data signals) of the film to the image processor.

The image processor sets an image processing condition based on the image data read by the scanner, executes an image process corresponding to the set condition on the image data, and transmits output image data (an exposure condition) for recording the image.

The printer, if classified as a device utilizing, e.g., a light beam scan exposure, modulates the light beams in accordance with the image data transmitted from the image processor, deflects the light beams in a main scan direction, then carries a photosensitive material in a sub-scan direction orthogonal to the main scan direction, forms a latent image by exposing (printing) the photosensitive material to the light beams bearing the image, subsequently executes a development process, etc. corresponding to the photosensitive material with the aid of the processor, and obtains a print (a photograph) on which the image photographed on the film is reproduced.

The image reader using the image sensor such as the CCD described above, however, exhibits a low resolution, and it has been therefore desired that the resolution be enhanced. What is contrived in contrast is, for instance, a method by which the pixels are shifted in vertical and lateral directions utilizing the piezoelectric effect by use of an area sensor such as an area CCD sensor, thereby quadrupling the resolution. This method of shifting the pixels of the area sensor, however, presents a problem in which the operation thereof becomes troublesome, and the cost increases.

SUMMARY OF THE INVENTION

It is a primary object of the present invention, which was devised to obviate the problems inherent in the prior art, to provide an image reader capable of increasing a resolution while simply keeping an area of light receiving elements of a sensor to some extent at a low cost.

To accomplish the above object, according to one aspect of the present invention, an image reader comprises n pieces of line sensors arranged in parallel in such a way that, with "n" being an integer of 2 or more, the n pieces of line sensors disposed at an equal pitch are shifted at a 1/n pitch in a sensor arranging direction with respect to other line sensors, first compensating means for compensating spatial positions of the n pieces of line sensors, second compensating means for compensating a train of signals of each of the n pieces of line sensors so that a predetermined moving average of a target pixel of the signal train in one line sensor is, in a signal train of another line sensor among the n pieces of line sensors, coincident with a predetermined moving average of a target pixel corresponding to the target pixel in the one line sensor, and interleaving means for interleaving the n trains of signals which have been compensated by the second compensating means.

According to another aspect of the present invention, an image reader comprises two line sensors arranged in parallel in such a way that a first line sensor of the two line sensors disposed at an equal pitch is shifted at half a pitch in a sensor arranging direction with respect to another line sensor, first compensating means for compensating spatial positions of the two line sensors, second compensating means for compensating a train of signals of each of the two line sensors so that a predetermined moving average of a target pixel of the signal train in the first line sensor of the two line sensors is, in a signal train of a second line sensor, coincident with a predetermined moving average of a target pixel corresponding to the target pixel in the one line sensor, and interleaving means for interleaving the two trains of signals which have been compensated by the second compensating means.

It is preferable that the two line sensors include the same optical filter on-sensor front surfaces.

When the moving average of the target pixel in the first line sensor is made, in the signal train of the second line sensor, coincident with the moving average of the target pixel corresponding to the target pixel in the first line sensor, the moving average with a smaller signal value is a basis to be made coincident with.

It is also preferable that the two line sensors transfer pixel signals in direction opposite to each other.

It is further preferable that four line sensors are structured such that in respective channels for three colors of R, G and B, the two line sensors are provided with respect to only the G-channel, a line sensor is provided with respect to each of R- and B-channels.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 2A and 2B are front view and a side schematically showing a scanner of the digital photo printer illustrated in FIG. 1, respectively;

DETAILED DESCRIPTION OF THE INVENTION

A preferred embodiment of an image reader according to the present invention will hereinafter be described in details with reference to the accompanying drawings.

Figure 1:
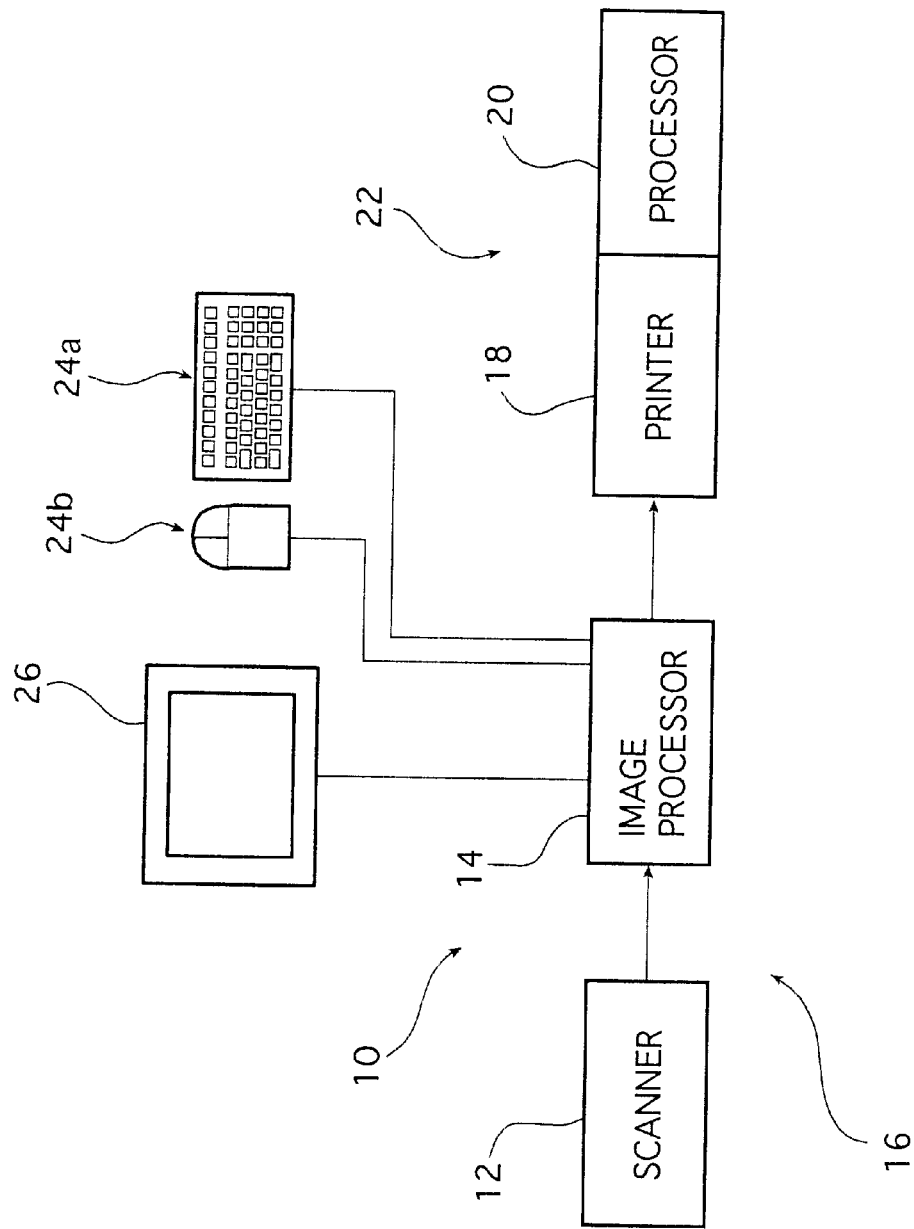
FIG. 1 is a block diagram showing one embodiment of a digital photo printer including an image reader according to the present invention.

FIG. 1 is a block diagram showing one embodiment of a digital photo printer using the image reader of the present invention.

A digital photo printer 10 shown in FIG. 1 comprises an input device 16 having a scanner (an image reader) 12 for photoelectrically reading an image photographed on a film and an image processor 14 for executing predetermined image processes on image data read by the scanner 12 into output image data, and of an output device 22 including a printer 18 for scan-exposing a photosensitive material (photographic printing paper) to light beams modulated corresponding to the output image data outputted by the image processor 14 and recording a latent image thereof and a processor 20 for executing a wet development process and a dry process upon the exposed photosensitive material and outputting it as a (finished) print.

Connected to the image processor 14 are a keyboard 24a and a mouse 24b for inputting (setting) a variety of conditions, and inputting a choice and an indication of processes, and indications about color/density compensations, etc., and a display 26 for displaying the image read by the scanner 12, a variety of operational indications, a setting/registration screen of various conditions.

FIG. 2A illustrates a front view of an outline of the scanner 12, and FIG. 2B illustrates a right side view thereof.

The scanner 12 comprises a light source unit 28 and a reading unit 30.

The light source unit 28 is encased in a casing 34 disposed under a working table 32 of the scanner 12 (the input device 16), wherein a light source 36 for emitting beams of reading light is disposed on the right side within the casing 34. Various types of light sources utilized in normal photoelectric image readers are, if sufficient in terms of a light quantity, usable as the light source 36, and a halogen lamp and a metal halide lamp, etc. maybe exemplified. A reflector 38 for making the light beams emitted from the light source 36 incident upon a film F at a high efficiency, is disposed along the periphery of the light source 36. Further, a cooling fan 40 for cooling an interior of the casing 34 and keeping it at a predetermined temperature, is disposed inside the casing 34.

Disposed downstream sequentially in a light traveling direction of the light beam emitted from the light source 36 (hereinafter referred to as downstream) within the casing 34 are an UV/IR cut filter (an ultraviolet ray/infrared ray cutting means) 42 for preventing a rise in temperature of the film F by cutting the light beams having wavelengths in ultraviolet and infrared regions, a first CC filter 44, a second CC filter 46, a variable stop 48, and a light diffusion box 50.

The first and second CC filters 44 and 46 compensate an instrument error of the scanner 12 by controlling color components of the (reading) light beams emitted from the light source 36 in order to properly read the image.

For example, the color components (light intensities in respective wavelength regions) of the light beams emitted from the light source 36, even if the same, are not completely uniform, and, for instance, there must be an individual difference such as being strong in intensity of a red region. Further, an image sensor 68 of the scanner 12 performs the image reading process with three line CCD sensors for reading respective images in red (R), green (G) and blue (B). Similarly, however, there is an individual difference in sensitivities of the line CCD sensors constituting the image sensor 68, and, e.g., there occurs an error such as an R-output being higher than a proper value.

The first and second CC filters 44 and 46 control the color components of the reading light beams with the color filters (of which colors are different from each other) assuming any one of R, G and B, and compensates the instrument error of the scanner 12, which might be attributed to the individual difference, etc. between the constructive elements.

The first and second CC filters 44 and 46 are not particularly limited to their configurations, and what is utilizable may include various type of filter elements capable of controlling an intensity of each color component of R, G and B affecting in an optical path of the reading light beams. There may be preferably exemplified, for example, a color filter plate through which a transmission density changes consecutively or stepwise, and a turret in which color filters having a plurality of densities are fixed into through-holes.

The variable stop 48 controls a light quantity of the reading light beams.

To be specific, the variable stop 48, when in a pre-scan which will be mentioned later on, controls the light quantity to a stop value set under a predetermined pre-scan reading condition and, when in a main scan for obtaining an output image, controls it to a stop value set based on the image data obtained by the pre-scan.

Figure 3:
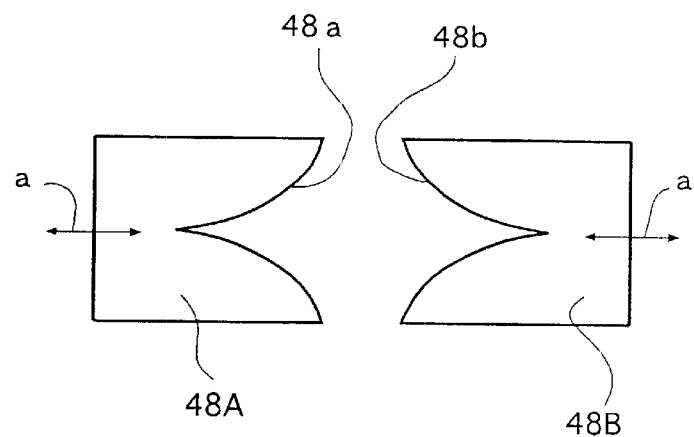
FIG. 3 is a conceptual diagram showing a variable stop disposed in the scanner shown in FIG. 2.

As shown in FIG. 3, the variable stop 48 in the illustrative example is constructed of two sheets of plate members 48A and 48B disposed in a face-to-face relationship with the optical axis being interposed therebetween on the plane orthogonal to the optical axis, these plate members being so slidable as to move close to and away from each other. These two plate members 48A and 48B are formed with notches 48a and 48b so that area sizes of the plate members 48A and 48B gradually increase in slide directions (arrow directions a) from the sides facing to each other.

Accordingly, an area size of an aperture defined by the notches 48a and 48b is controlled by the plate members 48A and 48B moving close to and away from each other, whereby the light quantity of the reading light beams traveling through the variable stop 48 can be controlled. The plate members 48A and 48B are moved by a stop drive motor, and a stop position sensor detects position of these plate members.

Note that the control of the light quantity by the variable stop 48 may involve the use of a known method such as using the number of movement pulses of the plate members 48A and 48B.

The light diffusion box 50 is a cylindrical member taking substantially an L-shape, and has light diffusion plates 50a and 50b so disposed at both opening ends, i.e., an incident port for the reading light beams and an exit port therefor as to close the opening planes thereof. The light diffusion box 50 also has a bent portion provided with a mirror for deflecting the light in a direction different at 90°. The exit port of the light diffusion box 50 assumes a slit-like configuration extending in the same direction as an extending direction (hereinafter referred to as a main scan direction) of the line CCD sensors of the image sensor 68 which will be explained later on.

The light beams incident upon the light diffusion box 50 are diffused by the light diffusion plates 50a and 50b, and at the same time changed into slit beams extending in the main scan direction, thus exiting therefrom. Note that a length thereof is large enough to irradiate the entire area in a widthwise direction thereof with the light beam.

As discussed above, the light source unit 28 is disposed under the working table 32.

The keyboard 24a, the mouse 24b and the display 26 are mounted in such positions on the upper surface of the working table 32 as not to exert an influence upon the optical system, and a carrier 54 is detachably attached in a predetermined position corresponding to the exit port of the light diffusion box 50.

The scanner 12 is prepared with the dedicated carriers 54 each attachable in a predetermined position of the working table 32, corresponding to a type and a size of a negative or reversal film such as an advanced photo system and a 135 size, and a film mode such as strips and a slide, and is capable of corresponding to the variety of films by replacing the carrier 54.

The scanner 12 in the illustrative example reads the image through a slit scan exposure. The elongate film F (strips) with a plurality of frames on which images are photographed, is located by the carrier 54 in a predetermined reading position corresponding to the exit port of the light diffusion box 50, then scanned and transported in an arrow direction b (hereinafter referred to as a sub-scan direction) in the figure that is orthogonal to the main scan direction by couples of carrier (transport) rollers 54a and 54b disposed with the reading position being interposed therebetween, and irradiated with the reading light beams from under. The scanner 12 two-dimensionally scans the film F with the reading light beams, thus obtaining projection light bearing the images. Then, the scanner 12 sequentially reads through the slit scan the images photographed on the respective frames of the film F.

Further, the carrier 54 serves as a mask for shaping in a predetermined slit-like configuration at least one of the reading light beams incident upon the film F and the projection light penetrating the film F.

Herein, the image reader for photoelectrically reading the image normally executes two image reading processes per frame, i.e., the pre-scan (pre-reading) for determining an image processing condition, etc. by reading the image with a low resolution, and the main scan (main reading) for obtaining the image data for outputting. The scanner 12 for carrying out the reading method according to the present invention, however, pre-scans all the photographed frames of the film F which is scanned and transported, e.g., in the arrow direction b and thus implements verification, in which case the image processing condition is set in a frame sequence opposite to that in the pre-scan, the verification is conducted in this setting sequence, the film F is thereafter scanned and transported in the reverse direction, and the main scan is performed in a frame-sequence opposite to that in the pre-scan.

As known well, a DX encoded film is that DX codes indicating a sensitivity and a type of the film F and bar codes indicating a frame number, are optically recorded on the film F, and reading means thereof is disposed in the carrier 54. The reading means such as a bar code reader reads the DX codes, etc. while scanning and transporting the film F, and items of data are transmitted to the image processor 14.

Furthermore, the film F of the advanced photo system is provided with a transparent magnetic recording medium on which data about the film F such as a classification of the film and a cartridge ID are recorded. Further, various items of data showing a print size, a date and a time of photography, whether an electronic flash is used or not when photographed and a development date when in photographing, development and printing, are magnetically recorded on the magnetic recording medium as the necessity may arise. A reading means for these items of magnetic information such as a magnetic head is also disposed in the carrier corresponding to the advanced photo system and, when transporting the film to a reading position, reads the magnetic information, and the information is transmitted to the image processor 14.

A reading unit 30 mounts in the casing 56 is disposed upwardly of the working table 32.

An optical frame 58 mounts on the upper surface of the working table 32, and the casing 56 is so supportedby the optical frame 58 as to be movable in such a direction (i.e., a direction of a depth of focus of a lens unit 64 (which is hereinafter termed an up-and-down direction)) as to move close to and away from the working table 32. A mount board 60 is provided within the casing 56, and a plurality of support rails 62 suspend from the mount board 60. The lens unit 64 is so supported by the support rails 62 as to be movable up and down.

The lens unit 64 is classified as an image forming lens unit composed of a plurality of lenses, through which the projection light on the film F is projected to form an image on an image sensor 68.

A lens stop 66 is disposed between the lenses of the lens unit 64. The lens stop 66 may be, e.g., an iris stop and is driven by a lens stop drive motor, thereby controlling a light quantity of the projection light projected to form the image on the image sensor 68 passing through the lens stop 66, i.e., the lens unit 64.

The image sensor 68 is fitted onto the mount board 60.

The image sensor 68 (a so-called color CCD sensor) is structured such that a multiplicity of CCD cells are arranged in one line, four line CCD sensors each provided with an electronic shutter mechanism extend in the main scan direction and are disposed at a predetermined interval in the sub-scan direction, and a color filter of any one of R, G and B is attached to a light incidence side of each of the line CCD sensors. Electric charges accumulated in the respective CCD cells (pixels) of the line CCD sensors are transferred in sequence from corresponding transfer units.

Further, a shutter 70 for taking data for a dark compensation of the image sensor 68 is disposed upstream (downward) of the image sensor 68.

Figure 4:
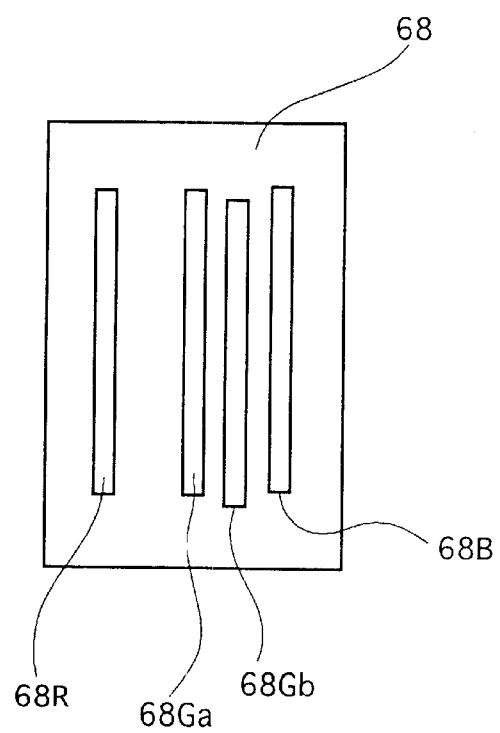
FIG. 4 is a conceptual diagram showing an image sensor disposed in the scanner shown in FIG. 2.

FIG. 4 schematically shows the image sensor 68. The image sensor 68 includes four line sensors, i.e., a line CCD sensor (an R line sensor) 68R, of which a sensor front surface is fitted with an R-color filter, for reading an R-image, two line CCD sensors (G line sensors) 68Ga, 68Gb, of which sensor front surfaces are fitted with G-color filters, for reading a G-image, a line CCD sensor (a B line sensor) 68B, of which a sensor front surface is fitted with a B-color filter, for reading a B-image. As explained above, those are so-called 3-color CCD sensors, and each of the line CCD sensors extends in the main scan direction.

Further, the R line sensor 68R, the G line sensor 68Ga and the B line sensor 68B are disposed at an equal interval, and the two G line sensors 68Ga, 68Gb are disposed shifting at half a pitch in the sensor arranging direction. When in the pre-scan, the three line CCD sensors 68R, 68Ga, 68B arranged at the equal interval execute the reading process, and, when in the main scan, all of the four line CCD sensors implement the reading process.

Figure 5:
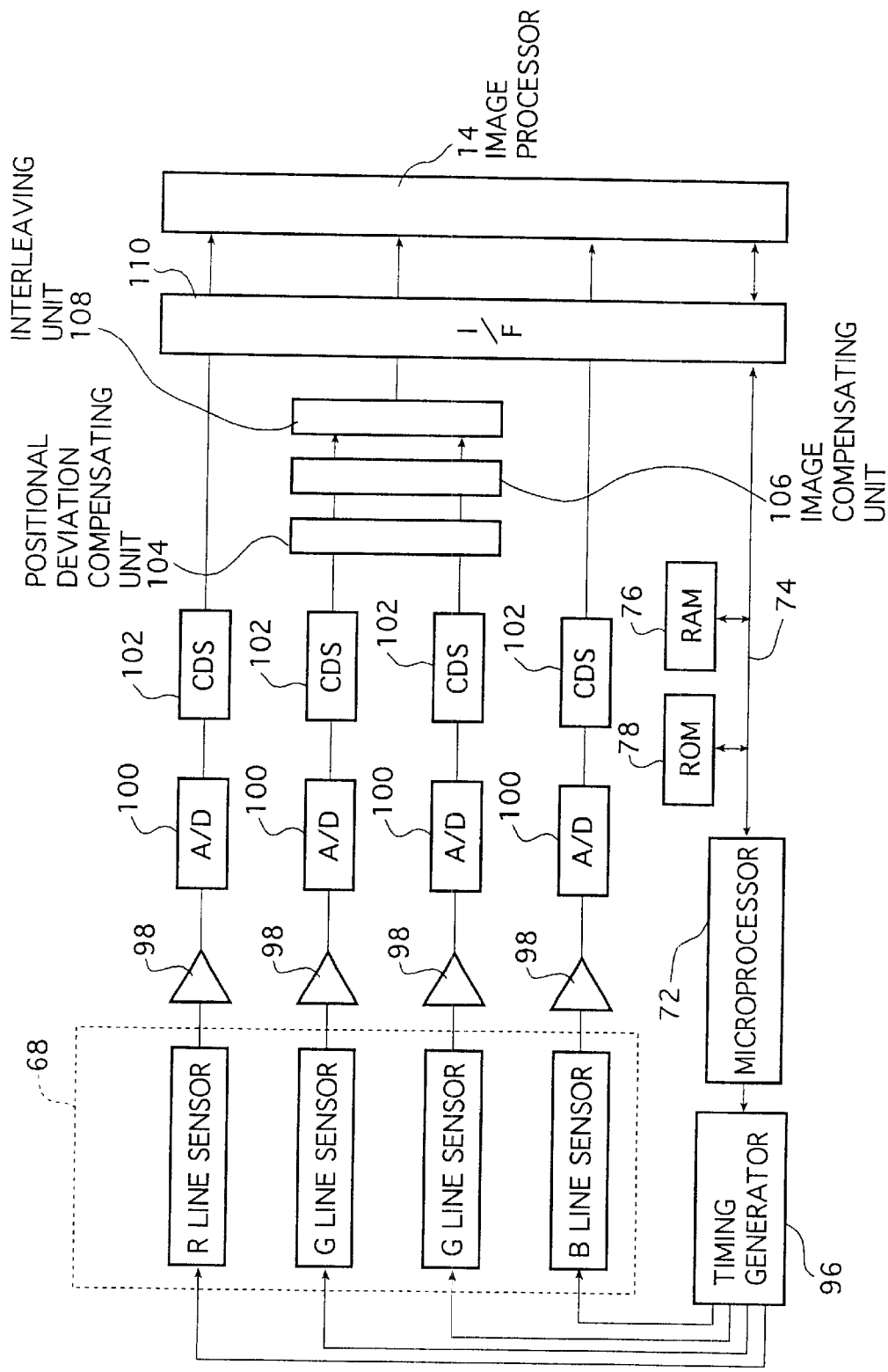
FIG. 5 is a block diagram of an electric system of the scanner shown in FIG. 2.

FIG. 5 is a schematic diagram showing an architecture of principal components of an electric system of the scanner 12.

The scanner 12 includes a microprocessor 72 for controlling the whole scanner 12. A RAM 76 and a ROM (e.g., an erasable programmable writable ROM) 78 are connected via a bus 74 to the microprocessor 72. Connected also to the microprocessor 72 are an unillustrated lamp driver for lighting up and extinguishing the light source 32 in accordance with an indication given from the microprocessor 72, or a motor driver. Connected to the motor driver are a stop drive motor for controlling a stop value by slide-moving the plate members 48A, 48B of the variable stop 48, a reading unit drive motor formoving up and down the casing 56 accommodating the reading unit 30, a lens drive motor for moving up and down the lens unit 64, a lens stop drive motor for controlling the lens stop 66, a shutter drive motor for switching over the shutter 70 to a full-closed or full-open state, and position sensors for detecting positions of the plate members 48A, 48B of the variable stop 48, a position of the casing 56, a position of the lens unit 64, and a position of the lens stop 66.

The microprocessor 72, when the image sensor 68 reads the image on the film F, controls the variable stop 48 with the stop drive motor in accordance with the position of the variable stop 48 and the set reading condition, thereby controlling the light quantity of the reading light beams incident upon the film F (control of a density of the original image).

Further, the microprocessor 72 determines a zooming ratio in accordance with a size of the film F and an indication to change a magnification, and controls the reading unit drive motor to move up and down the casing 56 on the basis of a detected position of the casing 56 through the position sensor so that the projection light on the film F is projected to form an image on the image sensor 68, corresponding to the determined zooming ratio. The microprocessor 72 also controls the lens drive motor to move up and down the lens unit 64 on the basis of the detected position of the lens unit 64.

Furthermore, a timing generator 96 for generating a variety of timing signals (clock signals) for operating the image sensor 68 and an A/D converter 100, etc., is connected to the image sensor 68. The microprocessor 72 gives an indication to the timing generator 96 in accordance with the set reading condition, whereby the line CCD sensors of the image sensor 68 read the image for a predetermined accumulation time (at an electronic shutter speed). Note that the accumulation time of each of the line CCD sensors may be independently set and controlled in accordance with the color balance of the original image.

Signals outputted from the image sensor 68 are amplified by an amplifier 98, and converted into digital image data by the A/D converter 100.

The digital image data converted by the A/D converter 100 are processed by a correlation duplex sampling circuit (CDS) 102, and sequentially outputted to the image processing unit 14 via an interface (I/F) circuit 110. Note that the CDS 102 subtracts, from the image data, a piece of field-through data representing a level of a field-through signal, thereby setting the image data as those capable of precisely corresponding to a quantity of the accumulated electric charges in each CCD cell.

As discussed above, in the G line sensor for reading the G-image when in the main scan, the two line CCD sensors 68Ga, 68Gb are disposed shifting at half a pitch in the sensor arranging direction. A positional deviation compensating unit 104 for compensating a spatial positional deviation in the sub-scan direction (orthogonal to the sensor arranging direction), is provided in order to compensate a signal outputted from one G line sensor. These two G line sensors 68Ga, 68Gb are, though a detailed discussion will be given later on, constructed to double a resolution at the time of the mains scan by reading the same main scan position with a half-pitch deviation. An image compensating unit 106 and an interleaving unit 108 are provided for two pixel signals of the G line sensors 68Ga, 68Gb. The image compensating unit 106 compensates the respective pixel signals so that predetermined moving averages of corresponding target pixels of the two pixel signals are coincident with each other, and the interleaving unit 108 interleaves and transmits the pixel signals after being compensated to the I/F circuit 110.

The R, G and B image data are outputted in parallel from the I/F circuit 110 to the image processor 14.

Figure 6:
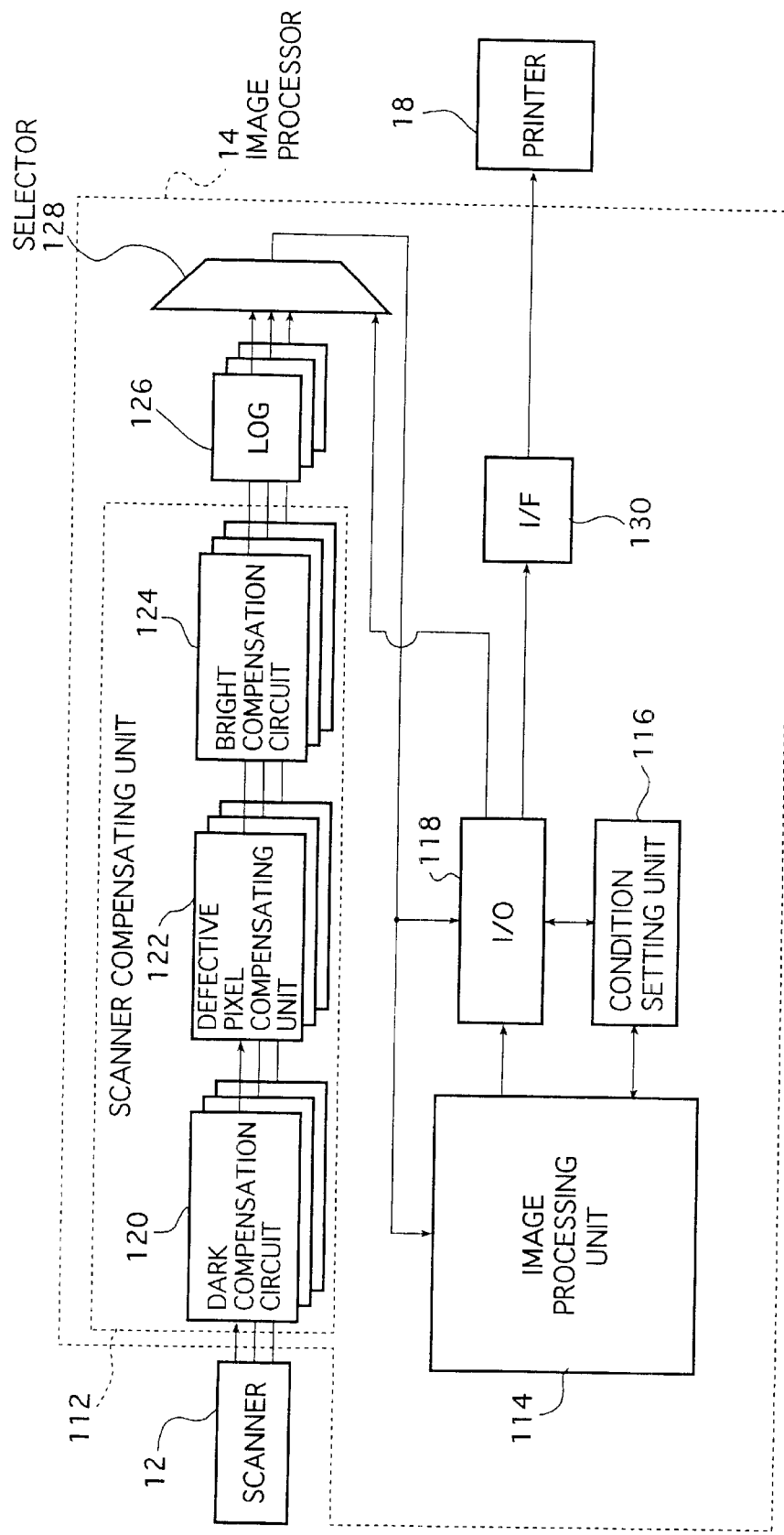
FIG. 6 is a block diagram illustrating an image processor of the digital photo printer shown in FIG. 1.

FIG. 6 is a block diagram of the image processor 14.

The image processor 14 comprises a scanner compensating unit 112, an image processing unit 114, a condition setting unit 116 and an I/O controller 118. In addition, the image processor 14 includes, though not shown, a personal computer for processing the pre-scan data under a predetermined processing condition and sequentially displays the processed data on the display 26.

The scanner compensating unit 112 is provided with three signal processing systems each consisting of a dark compensation circuit 120, a defective pixel compensating unit 122 and a bright compensation circuit 124, corresponding to the R, G and B image data outputted in parallel from the scanner 12.

The dark compensation circuit 120 performs a dark (dark current) compensation of the image sensor 68. The dark compensation circuit 120, for example, when the shutter 70 is closed, measures the image data (representing an dark output level of each cell (pixel) of the image sensor 68) outputted from the scanner 12 and is stored with the data per pixel. Then, the dark compensation circuit 120 executes the dark compensation by subtracting the data assuming this dark output level from the image data of the film F which have been outputted from the scanner 12.

The defective pixel compensating unit 122 compensates a defective pixel on the image sensor 68. The defective pixel compensating unit 122 is, for instance, stored with an address of the (defective) pixel of which an output is conceived abnormal in the image data of an adjusting film (reference original) read by the scanner 12, and interpolates the image data of peripheral pixels in the image data of the film F which have been output from the scanner 12, thereby generating the image data of the defective pixel.

The bright compensation circuit 124 compensates a dispersion in output per pixel on the image sensor 68. The bright compensation circuit 124, as in the above case, determines a gain for compensating the dispersion in output per pixel by use of the image data of the adjusting film, and compensates in accordance with the gain the image data of the film F which have been outputted from the scanner 12.

Further, the four line CCD sensors (only two sensors with respect to G) of the image sensor 68 are disposed at the interval in the sub-scan direction, and hence there is a difference in timing at which the scanner 12 starts outputting the image data of each of R, G and B. The scanner compensating unit 112 delays the image data output timing with a delay time different per component color so that the R, G and B data of the same pixel on the image are simultaneously outputted.

The image data outputted from the scanner compensating unit 112 are outputted to a LOG converter 126. The LOG converter 126 executes a logarithmic converting process of converting a gradation (tone) of the digital image data into digital image density data. The LOG converter 126, with, e.g., a look-up table (LUT) being used, converts 12 bit digital image data compensated by the scanner compensating unit 112 into 10 bit (0–1023) digital image density data.

The image data outputted from the LOG converter 126 are inputted to a selector 128. Further, an input terminal of the selector 128 is connected to a data output terminal of the I/O controller 118, and the image data inputted from outside are inputted to the selector 128 from the I/O controller 118.

The output terminal of the selector 128 is connected to the I/O controller 118 and the image processing unit 114 as well. The selector 128 selectively outputs the supplied image data to the I/O controller 118 and the image processing unit 114.

The image processing unit 114 obtains the output image data for outputting by executing, on the main scan image data, predetermined image processes such as, e.g., a gray (color) balance control, a gradation compensation, a density compensation (brightness compensation), a shading process (a compression/extension of a density dynamic range), a saturation compensation, an electronic magnification varying process, and a sharpness (sharpening) process. The processed image data are outputted to I/O controller 118.

Based on the image data inputted from the I/O controller 118, the condition setting unit 116 extracts the data in an area corresponding to each film frame (image), detects a frame position, and sets (calculates) the main scan reading condition and the image processing condition per frame. More specifically, the condition setting unit 116 creates a density histogram per frame from the pre-scan data, and calculates image characteristic quantities such as an average density, an LATD (large area transmission density), a highlight (a minimum density), a shadow (a maximum density).

Furthermore, the condition setting unit 116, in addition to the density histogram, the image characteristic quantities and the film data, etc., sets the image processing conditions such as the density compensation and the gray balance control per frame in accordance with an indication given according to the necessity by the operator using the keyboard 24a and the mouse 24b. the condition setting unit 116, when setting the processing condition and the reading condition in the case of qualifying the image, outputs the set processing condition and the pre-scan image data to a personal computer. This image is displayed as a simulation image on the display 26.

The I/O controller 118 is connected via the I/F circuit 130 to the printer 18.

When the processed image data is recorded as an image on the photosensitive material in the printer 18, the output image data subjected to the image process in the image processing unit 114 are outputted via the I/F circuit 130 to the printer 18 as the output image data from the I/O controller 118.

The output device 22 includes the printer 18 and the processor 20. The output device 22 exposes the photosensitive material (photographic printing paper) to the light according to the output image data outputted from the image processor 14 (the input device 16), then records a latent image thereof, and, after executing a predetermined development process, outputs it as a (finished) print.

The printer 18 records the latent image on, if given by way of one example, a cut-sheet photosensitive material through the light beam scan exposure. In the printer 18, the photosensitive material is cut to a predetermined length corresponding to a print to be made, thereafter records a back print, and subsequently deflects in the main scan direction three light beams for R-exposure, G-exposure and B-exposure corresponding to spectral sensitivity characteristics of the photosensitive material by modulating these light beams in accordance with the image data (record image). Then, the photosensitive material is transported in the sub-scan direction orthogonal to the main scan direction, during which the photosensitive material is two-dimensionally scan-exposed to the light beams, a latent image is thus recorded, and the exposed photosensitive material is transferred to the processor 20.

In the processor 20, the photosensitive material supplied receives predetermined wet development processes such as a color development, bleach-fix and washing, whereby the latent image is changed into a visible image. Subsequently, a print is obtained after being dried, and thereafter the prints are sorted into one group such as one roll of film, and thus accumulated.

A much greater description of the image reader according to the present invention will hereinafter be made by explaining the operation of the digital photo printer 10.

To begin with, the operator starts up the digital photo printer 10, and, after the carrier 54 corresponding to the film F to be read is set in a predetermined position of the operation table 32, confirms whether or not the input device 16 is in a predetermined status as to the light quantity of the light source 36, etc., and further sets in the predetermined position the carrier 54 for the film F (which may be a cartridge in the case of the advanced photo system) supplied for making the print.

Upon the input device 16 being brought into the predetermined state corresponding to making the print and the carrier 54 confirming that the film F is loaded, the scanner 12 comes into a pre-scan state, and the microprocessor 72 sets a stop value of the variable stop 48 and an accumulation (storage) time of each line CCD sensor of the image sensor 68 in accordance with the predetermined pre-scan reading condition.

Simultaneously, the magnification is adjusted by moving up and down the lens unit 64 and the casing 34 as well in accordance with the type of the film F and the print size, etc.

When the scanner 12 comes into a state corresponding to the pre-scan, subsequently the carrier 54 starts scanning and transporting the film F at a pre-scan speed in the sub-scan direction (an arrow direction b in FIG. 2A). Then, the light beams are emitted from the light source 36 and regulated by the variable stop 48, and the reading light beams diffused in the light diffusion box 50 are incident upon the film F located in the reading position and carried by the carrier 54. Then, the projection light beams on the film F are projected to form the images on the image sensor 68 through the lens unit 64, and the images are photoelectrically read by the R, G and B line CCD sensors. Note that the pre-scan is intended to read the image with a low resolution, there is not necessity for executing the processes according to the present invention in the pre-scan, and the images are read by the three line CCD sensors 68R, 68Ga, and 68B arranged at the equal spacing.

As discussed above, the reading light beam is defined as the slit light beam extending in the main scan direction, and the film F is transported with its longitudinal direction being coincident with the sub-scan direction orthogonal to the main scan direction, and is therefore two-dimensionally scanned by the slit light beam.

Further, the DX codes, etc. recorded on the film F are read in parallel with the pre-scan by the carrier 54, and, in the case of the advanced photo system, pieces of data magnetically recorded on the film F are also read. The data are properly transmitted to the processor 14 and detected as film data such as a film type and a frame number.

The output signals from the image sensor 68 are amplified by the amplifier 98 and converted into digital image data by the A/D converter 100. The digital image data are compensated by the CDS 102 and transmitted as pre-scan data to the image processor 14 from the I/F circuit 110.

The pre-scan data transmitted to the image processor 14 undergo the dark compensation, the defective pixel compensation and the bright compensation in the scanner compensating unit 112, and are outputted to the I/O controller 118 by the selector 128. The pre-scan data are transmitted therefrom to the condition setting unit 116.

The condition setting unit 116 extracts frame pre-scan data and a frame position by use of the above pre-scan data and the film data. The condition setting unit 116 also creates the density histogram and calculates the image characteristic quantities per frame, and sets the reading condition and processing condition per frame in the way described above.

When the operator verifies the images, the pre-scan data and the processing condition thereof are sequentially transmitted to the personal computer, and the display 26 displays the processed images are displayed as simulation images of the images to be reproduced as a print.

The operator sequentially verifies the images while observing the simulation images displayed on the display 26, and, as the necessity may arise, compensates the images per frame by use of adjustment keys of the keyboard 24a. Corresponding thereto, the preset processing condition is adjusted (compensated), and simultaneously the simulation images displayed on the display 26 are changed. The operator, when judging that the frame image concerned is proper (verification: OK), gives an indication of finishing the verification of the frame concerned, and performs the verification of the next frame.

Upon thus finishing the verifications, the operator issues an indication of starting the printing, whereby the processing condition of each frame is transmitted to the image processing unit 114, while the reading condition is transmitted to the microprocessor 72.

Subsequently, in the scanner 12, the carrier 54 starts transporting the film F at a velocity corresponding to the main scan, and the main scan is conducted based on the set reading condition per frame.

It is herein required that the resolution in the reading process be enhanced for reproducing high-quality images. As will hereinafter be explained, the present invention aims at increasing the resolution by a factor of two, which involves arranging the two line G line sensors with the half-pitch deviation and effecting the predetermined processes on the main scan image data obtained therefrom.

Figure 7A:
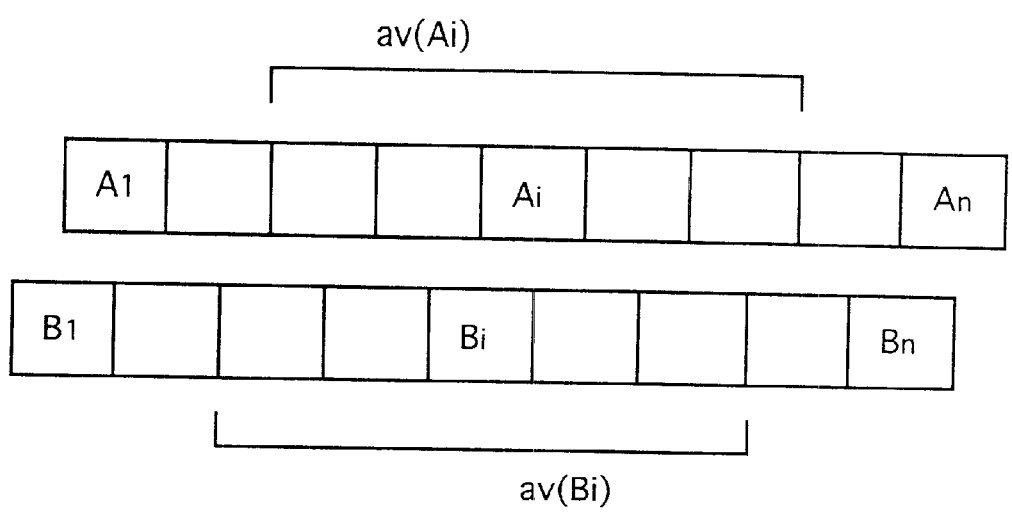
FIG. 7A is an explanatory diagram showing two line sensors arranged with a half-pitch deviation.

FIG. 7A schematically shows the G line sensors in enlargement. As described above, the configuration of the G line sensors is that the two line sensors 68Ga and 68Gb including the same G-color filters provided on the sensor front surfaces are arranged in parallel shifting at half a pitch. Incidentally, at this time, the G line sensors 68Ga and 68Gb are contrived to transfer the pixel signals in the directions opposite to each other. With this contrivance, one line CCD sensor transfers the pixel signals, during which the other line CCD sensor has already finished the transfer thereof (or alternatively does not yet transfer). Hence, it never happens that the output increases even when the light beam impinge during the transfer of the pixel electric charges, and it is feasible to reduce an occurrence of smear.

The pixel signals read by the G line sensors 68Ga, 68Gb are inputted to the position compensating unit 104 in order to compensate a spatial positional deviation.

Supposing that a spacing between those two G line sensors 68Ga, 68Gb is equivalent to, e.g., three lines, the position compensating unit 104 compensates the positional deviation so that the pixel signals of the G line sensors 68Ga and 68Gb are in concordance with the same main scan position by making the processing of the previously read data delayed for three lines.

The pixel signals, of which the spatial positional deviations have been compensated, are inputted to the image compensating unit 106.

The image compensating unit 106 calculates moving averages of the corresponding target pixels with respect to the individual pixel signals, and compensate each pixel value so that the moving averages are coincident with each other. This moving average is obtained by averaging, e.g., values of five pixels arranged in a side-by-side relationship with each target pixel being centered.

To be more specific, assuming in FIG. 7A that the target pixel is a pixel $A_i$ in the pixel signal of the G line sensor 68Ga, an average av $(A_i)$ of five pixels $A_{i-2}, A_{i-1}, A_i, A_{i+1}, A_{i+2}$ with the pixel $A_i$ being centered is calculated by the following formula, and this average av $(A_i)$ may be referred to as a moving average.

$$av(A_i)=(A_{i-2}+A_{i-1}+A_i+A_{i+1}+A_{i+2})/5$$

Moreover, a moving average av ($B_i$) with respect to a pixel Bi corresponding to the pixel $A_i$ in the pixel signal of the G line sensor 68Gb, is likewise calculated. Then, these averages are compared, and the smaller average is a basis to be matched with. Namely, offset values $\alpha(A_i)$, $\alpha(B_i)$ by which to compensate the respective pixel values, are calculated by the following formulae:

$$\alpha(A_i)=|\min\{av(A_i), av(B_i)\}-av(A_i)|$$

$$\alpha(B_i)=|\min\{av(A_i), av(B_i)\}-av(A_i)|$$

The pixel values are compensated by adding these offset values to the respective pixels as shown in the following formulae:

$$Ai'=A_i+\alpha(A_i)$$

$$Bi'=B_i+\alpha(B_i)$$

As can be understood from these formulae, the pixel value with the smaller moving average does not change by this compensation. As a result, the moving average is coincident with the smaller.

Figure 7B:
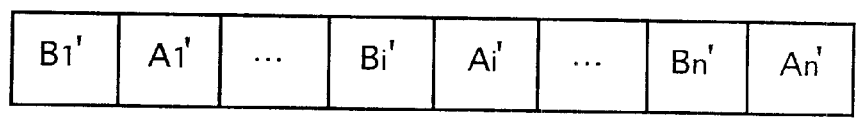
FIG. 7B is an explanatory diagram showing a train of signals into which signals from the two line sensors are interleaved.

The pixel signal with the image compensated for a coincidence of the moving average is inputted to the interleaving unit 108. The interleaving unit 108 interleaves, as shown in FIG. 7B, the pixel signals after being compensated, i.e., the pixel signal Ai' of the G line sensor 68Ga and the pixel signal Bi' of the G line sensor 68Gb. As a consequence, the resolution is doubled in a pseudo manner.

In this embodiment, only the G channel is provided with the two line sensors, a reason of which is that G is vicinal to a visual density, and the processing may be implemented by inputting luminance data (Y) with a visual density meter used as a substitute for the two G line sensors arranged in parallel.

In any case, the G-component is the most principal in the image data, and there is increased the resolution with respect to this, whereby the quality of the image for outputting can be enhanced.

The interleaved G-pixel signal is outputted together with the R- and B-pixel signals to the image processor 14 via the I/F circuit 110.

The main scan data outputted from the I/F circuit 110 of the scanner 12 are processed by the scanner compensating unit 122, and transmitted to the image processing unit 114 by the selector 128. Now, the number of pixels is doubled with respect to only G, and it is therefore required that the number of pixel with respect to each of R and B be matched therewith by increasing it by a factor of 2. A method thereof may be contrived in many ways, and, though not particularly limited, for instance, the number of pixels may be doubled by dividing the i-th pixel value $R_i$ of R into $R_{i'}$, $R_{i''}$ with a proportional distribution by the G's pixel values $B_{i'}$, $A_{i'}$ corresponding thereto. The number of pixels with respect to B is similarly doubled.

The image data transmitted to the image processing unit 114 are subjected to the predetermined image processes under the processing condition set corresponding to each frame, and finally converted into the output image data in a format suited to the output device. The output image data are transmitted via the I/f circuit 130 to the printer 18 from the I/O controller 118. The printer 18 having received the output image data, as described above, records the back print. Further, the photosensitive material is two-dimensionally scan-exposed to the light beams modulated corresponding to the image data and is thereby formed with a latent image and carried to the processor 20. The exposed photosensitive material transported to the processor 20 undergoes the predetermined processes such as the wet development process and the dry process and is outputted as prints. The prints are then sorted and accumulated.

Thus, according to this embodiment, the images are read by use of the two line sensors shifted at half a pitch with respect to G, and hence the resolution can be doubled without increasing the area of the light receiving elements so much. Further, these two line sensors are constructed to transfer the pixel signals in the directions reversal to each other, and it is therefore feasible to restrain the occurrence of smear.

Note that the two line sensors are provided for only G in this embodiment but may also be provided shifting at half a pitch for each of R and B, and six line sensors may also be provided by structuring dual lines for each of R, G and B.

It is to be noted that the present invention is not limited to the configuration that the two line sensors are arranged with the half-pitch deviation but may be applied to a configuration in which three line sensors are arranged with a 1/3 pitch deviation in order to obtain a 3-fold resolution, or four line sensors are arranged with a 1/4 pitch deviation to quadruple the resolution, or generally n-pieces of line sensors are arranged with a 1/n pitch deviation so that the resolution is increased by a factor of "n".

The image reader according to the present invention has been discussed so far in details. The present invention is not, however, confined to the embodiment described above and may be, as a matter of course, modified and improved in many ways within the scope of the present invention without deviating from the gist thereof.

As explained above, according to the present invention, it is possible to double the resolution while the area of the light receiving elements is kept to some extent.

Furthermore, when the two line sensors arranged with the half-pitch deviation transfer the pixel signals in the direction opposite to each other, the occurrence of smear can also be reduced.

What is claimed is:

1. An image reader, comprising:

n line sensors arranged in parallel in such a way that, with "n" being an integer of 2 or more, said n line sensors have the same pixel pitch in a pixel arranging direction and are shifted at a 1/n pitch in the pixel arranging direction with respect to other line sensors;

first compensating means for compensating spatial positions of said n line sensors;

second compensating means for compensating a train of signals of each of said n line sensors so that a predetermined moving average of a target pixel of the signal train in one line sensor is, in a signal train of another line sensor among said n line sensors, coincident with a predetermined moving average of a target pixel corresponding to said target pixel in said one line sensor; and interleaving means for interleaving said n trains of signals which have been compensated by the second compensating means.

2. An image reader, comprising:

two line sensors arranged in parallel in such a way that a first line sensor of said two line sensors has the same pixel pitch in a pixel arranging direction as a second line sensor and is shifted at half a pitch in the pixel arranging direction with respect to the second line sensor;

first compensating means for compensating spatial positions of said two line sensors;

second compensating means for compensating a train of signals of each of said two line sensors so that a predetermined moving average of a target pixel of the signal train in the first line sensor line of said two line sensor is, in a signal train of the second line sensor, coincident with a predetermined moving average of a target pixel corresponding to said target pixel in said first line sensor; and interleaving means for interleaving said two trains of signals which have been compensated by the second compensating means.

3. The image reader according to claim 2, wherein said two line sensors include the same optical filter on sensor front surfaces.

4. The image reader according to claim 2, wherein when the moving average of said target pixel in said first line sensor is made, in the signal train of said second line sensor, coincident with the moving average of said target pixel corresponding to said target pixel in said first line sensor, the moving average with a smaller signal value is a basis to be made coincident with.

5. The image reader according to claim 2, wherein said two line sensors transfer pixel signals in a direction opposite to each other.

6. The image reader according to claim 2, wherein four line sensors are structured such that in respective channels for three colors of R, G and B, said two line sensors are provided with respect to only the G-channel, a line sensor is provided with respect to each of R- and B-channels.

* * * * *